US008677075B2

(12) United States Patent
Mital et al.

(10) Patent No.: US 8,677,075 B2
(45) Date of Patent: Mar. 18, 2014

(54) MEMORY MANAGER FOR A NETWORK COMMUNICATIONS PROCESSOR ARCHITECTURE

(75) Inventors: Deepak Mital, Orefield, PA (US); William Burroughs, Macungie, PA (US); David Sonnier, Austin, TX (US); Steven Pollock, Allentown, PA (US); David Brown, Austin, TX (US); Joseph Hasting, Orefield, PA (US)

(73) Assignee: LSI Corporation, Milpitas, CA (US)

( * ) Notice: Subject to any disclaimer, the term of this patent is extended or adjusted under 35 U.S.C. 154(b) by 219 days.

(21) Appl. No.: 13/359,690

(22) Filed: Jan. 27, 2012

(65) Prior Publication Data

US 2012/0131283 A1    May 24, 2012

Related U.S. Application Data

(63) Continuation-in-part of application No. 12/782,379, filed on May 18, 2010, and a continuation-in-part of application No. 12/782,393, filed on May 18, 2010, and a continuation-in-part of application No. 12/782,411, filed on May 18, 2010.

(60) Provisional application No. 61/486,811, filed on May 17, 2011.

(51) Int. Cl.
 *G06F 12/00* (2006.01)
(52) U.S. Cl.
 USPC .......................................... 711/147; 711/113
(58) Field of Classification Search
 USPC .................................. 711/147, 133
 See application file for complete search history.

(56) References Cited

U.S. PATENT DOCUMENTS

| 4,622,631 | A | 11/1986 | Frank et al. |
|---|---|---|---|
| 4,695,949 | A * | 9/1987 | Thatte et al. ........................ 1/1 |
| 5,623,698 | A | 4/1997 | Stephenson et al. |
| 5,699,551 | A | 12/1997 | Taylor et al. |
| 5,892,766 | A | 4/1999 | Wicki et al. |
| 5,943,283 | A | 8/1999 | Wong et al. |
| 6,038,630 | A | 3/2000 | Foster et al. |
| 6,195,335 | B1 | 2/2001 | Calvignac et al. |
| 6,567,564 | B1 | 5/2003 | van der Wal |
| 6,636,932 | B1 | 10/2003 | Regev et al. |
| 6,725,337 | B1 | 4/2004 | Tan et al. |
| 6,772,298 | B2 | 8/2004 | Khare et al. |
| 6,981,105 | B2 | 12/2005 | Bourne et al. |
| 7,089,346 | B2 | 8/2006 | Cebulla et al. |
| 7,234,018 | B1 | 6/2007 | Purcell et al. |
| 7,461,208 | B1 | 12/2008 | Caprioli et al. |
| 7,596,142 | B1 | 9/2009 | MacAdam |
| 7,613,882 | B1 | 11/2009 | Akkawi et al. |

(Continued)

*Primary Examiner* — Hashem Farrokh (57) ABSTRACT

Described embodiments provide a network processor having a plurality of processing modules coupled to a system cache and a shared memory. A memory manager allocates blocks of the shared memory to a requesting one of the processing modules. The allocated blocks store data corresponding to packets received by the network processor. The memory manager maintains a reference count for each allocated memory block indicating a number of processing modules accessing the block. One of the processing modules reads the data stored in the allocated memory blocks, stores the read data to corresponding entries of the system cache and operates on the data stored in the system cache. Upon completion of operation on the data, the processing module requests to decrement the reference count of each memory block. Based on the reference count, the memory manager invalidates the entries of the system cache and deallocates the memory blocks.

20 Claims, 4 Drawing Sheets

(56) References Cited

U.S. PATENT DOCUMENTS

| | | |
|---|---|---|
| 8,074,047 B2 * | 12/2011 | Abali et al. .................. 711/206 |
| 2002/0029214 A1 | 3/2002 | Yianilos et al. |
| 2002/0165985 A1 | 11/2002 | Chen et al. |
| 2003/0033276 A1 | 2/2003 | Cheng et al. |
| 2003/0115417 A1 | 6/2003 | Corrigan |
| 2003/0123468 A1 | 7/2003 | Nong |
| 2004/0255209 A1 | 12/2004 | Gross |
| 2005/0027920 A1 | 2/2005 | Fitzsimmons et al. |
| 2005/0152352 A1 | 7/2005 | Jun et al. |
| 2006/0256783 A1 | 11/2006 | Ayrapetian et al. |
| 2007/0016756 A1 | 1/2007 | Hsieh et al. |
| 2007/0226798 A1 | 9/2007 | Sibert |
| 2008/0162793 A1 | 7/2008 | Chu et al. |
| 2010/0260198 A1 | 10/2010 | Rojas-Cessa et al. |
| 2011/0225376 A1 * | 9/2011 | Hasting et al. ................ 711/154 |

* cited by examiner

MEMORY MANAGER FOR A NETWORK COMMUNICATIONS PROCESSOR ARCHITECTURE

CROSS-REFERENCE TO RELATED APPLICATIONS

This application claims the benefit of the filing date of U.S. provisional application No. 61/486,811 filed May 17, 2011, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, and Ser. No. 12/782,411 filed May 18, 2010, the teachings of which are incorporated herein in their entireties by reference.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, Ser. No. 12/963,895 filed Dec. 9, 2010, Ser. No. 12/971,742 filed Dec. 17, 2010, Ser. No. 12/974,477 filed Dec. 21, 2010, Ser. No. 12/975,823 filed Dec. 22, 2010, Ser. No. 12/975,880 filed Dec. 22, 2010, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, Ser. No. 12/979,800 filed Dec. 28, 2010, Ser. No. 13/046,717 filed Mar. 12, 2011, Ser. No. 13/046,719 filed Mar. 12, 2011, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011 and Ser. No. 13/316,145 filed Dec. 9, 2011, the teachings of which are incorporated herein in their entireties by reference.

BACKGROUND OF THE INVENTION

1. Field of the Invention

The present invention relates to communication systems, in particular, to an accelerated processor architecture for network communications.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

In a typical SoC, whether a fixed-pipeline or non-pipelined architecture, data might be stored in a shared memory. Some solutions might temporarily store data in a data cache during operation of the SoC. When a given processing module of the SoC is finished processing data stored in the data cache, the data might be written from the data cache to the shared memory. Storing data in the data cache for long periods of time could require the data cache to be implemented using a large amount of memory.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention provide a network processor having a plurality of processing modules coupled to a system cache and a shared memory. A memory manager allocates blocks of the shared memory to a requesting one of the processing modules. The allocated blocks store data corresponding to packets received by the network processor. The memory manager maintains a reference count for each allocated memory block indicating a number of processing modules accessing the block. One of the processing modules reads the data stored in the allocated memory blocks, stores the read data to corresponding entries of the system cache and operates on the data stored in the system cache. Upon completion of operation on the data, the processing module requests to decrement the reference count of each memory block. Upon receiving the request to decrement the reference count of each of the memory blocks, the memory manager determines the updated reference count of the memory blocks. When the reference count for a given memory block reaches a predetermined threshold value: (1) the given memory block contains unneeded data, (2) the one or more entries in the system cache corresponding to the unneeded data are invalidated, making the entries of the system cache available to store new data, and (3) the given memory block is deallocated, making the given memory block available to be reallocated.

BRIEF DESCRIPTION OF THE DRAWING

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, utilization and performance of a system cache and external memory might be improved when the contents of a deallocated memory block are invalidated early in the system cache. When the processing of data stored in the system cache is complete, the memory block in the external memory might be deallocated. Any data remaining in the system cache that is associated with a deallocated memory block of the external memory might be invalidated, which improves performance of the system cache by allowing cache memory to be freed earlier and re-used sooner. This also reduces processing by the system cache by reducing the writing of invalid data and unused data corresponding to a deallocated memory block back to the external memory. Additionally, bandwidth of the external memory is more efficiently employed by performing fewer write operations to the external memory.

Table 1 defines a list of acronyms employed throughout this specification as an aid to understanding the described embodiments of the present invention:

TABLE 1

| USB | Universal Serial Bus | FIFO | First-In, First-Out |
| --- | --- | --- | --- |
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SoC | System-on-Chip | µP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | AAL5 | ATM Adaptation Layer 5 |
| MTM | Modular Traffic Manager | SED | Stream Editor |
| TCP | Transmission Control Protocol | PIC | Packet Integrity Checker |
| IP | Internet Protocol | CRC | Cyclic Redundancy Check |

Figure 1:
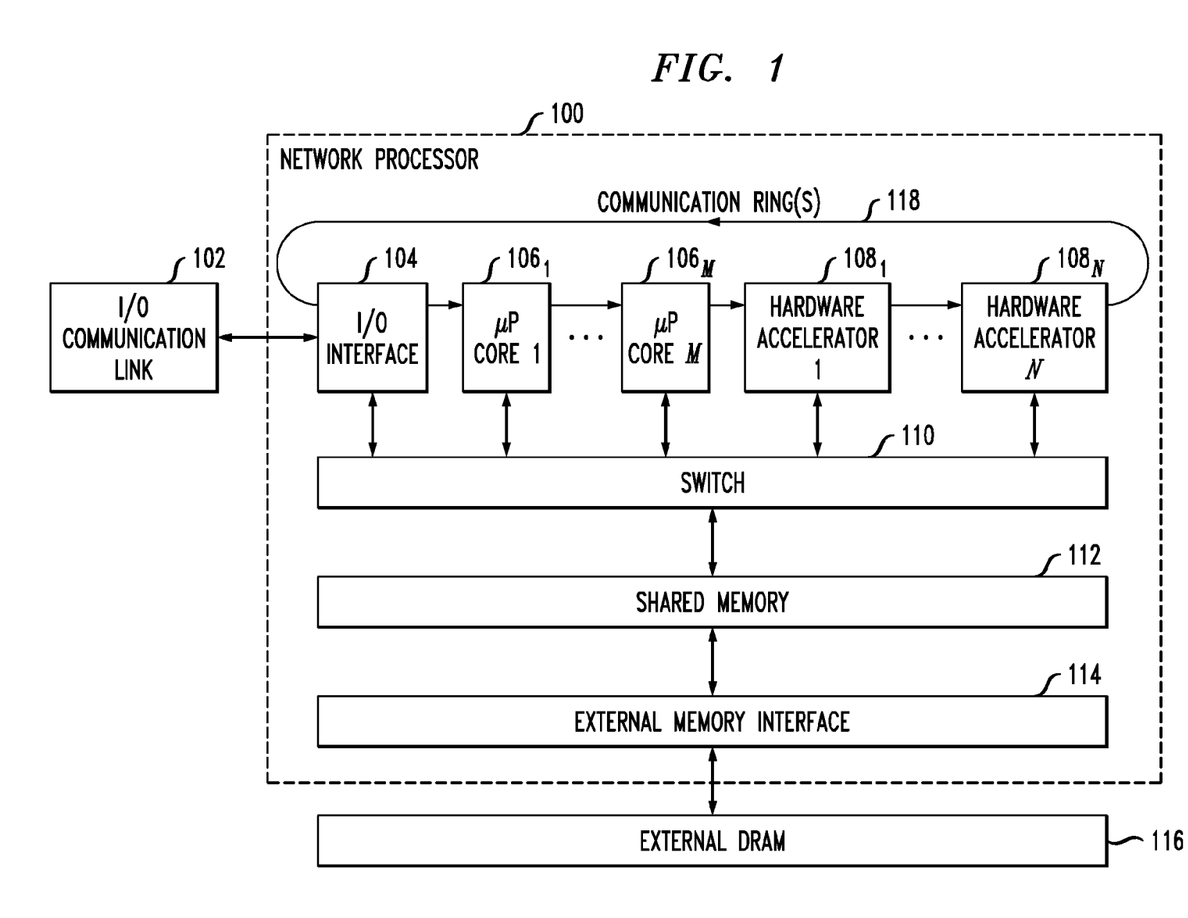
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, µP cores and hardware accelerators might be coupled through switch 110 to shared memory 112. Switch 110 might be implemented as a non-blocking crossbar switch such as described in related U.S. patent applications Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more sub-caches (e.g., sub-caches 302 of FIG. 3) that might be dynamically allocated to the various µP cores 106 and hardware accelerators 108. External memory interface 114 couples shared memory 112 to one or more external memories, shown as external memory 116, to provide off-chip storage of data not currently in use by the various µP cores 106 and hardware accelerators 108 to free space in shared memory 112. As indicated by dashed line 310 of FIG. 3, shared memory 112 and external memory 116 might generally be referred to as system memory 312. In general, system memory 312 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In embodiments of the present invention, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent applications Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, which is incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the MPP. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S. patent application Ser. Nos. 13/046,717, 13/046,719, and 13/046,726 all filed Mar. 12, 2011, which are incorporated by reference herein.

The MMB allocates and frees memory resources in shared memory 112. Memory is allocated for such applications as task FIFO storage, packet data storage, hash-table collision handling, timer event management, and traffic manager queues. The MMB provides reference counts for each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, and blocks might be available in various predetermined sizes. For example, the blocks might typically be in one of the following sizes: 256, 2048, 16384, and 65536 bytes. The MMB might operate substantially as described in related U.S. patent application Ser. No. 12/963,895 filed Dec. 9, 2010, which is incorporated by reference herein.

Figure 2:
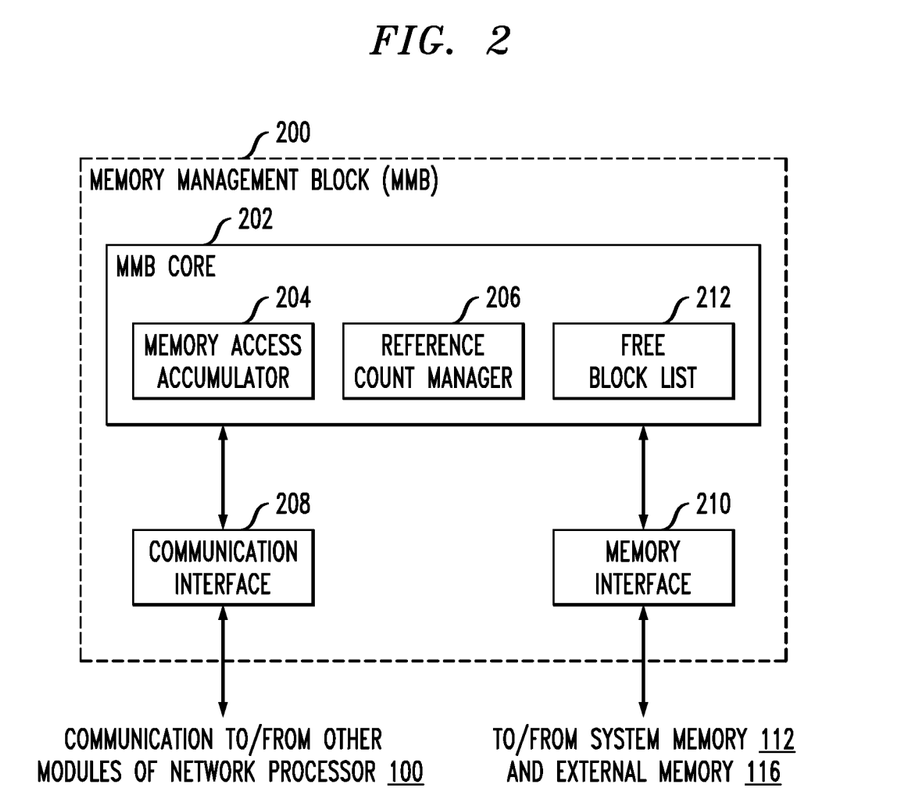
FIG. 2 shows a block diagram of a memory manager sub-module of the network processor of FIG. 1 in accordance with exemplary embodiments of the present invention.

FIG. 2 shows a block diagram of an exemplary memory management block (MMB) 200, in accordance with embodiments of the present invention. As described, MMB 200 manages memory blocks in system memory 112. System memory 112 might also contain a section of memory in which MMB 200 stores addresses of available or 'free' memory blocks. As shown in FIG. 2, MMB 200 includes memory interface 210 to interface between MMB core 202 and system memory 112 and external memory 116. MMB core 202 might be a processing unit, for example a finite state machine (FSM), for executing memory allocation and deallocation operations, for example, for processing requests for memory blocks and requests to increment or decrement a reference count corresponding to each memory block.

As shown in FIG. 2, MMB 200 includes communication interface 208 that is in communication with one or more modules of network processor 100, for example, the various hardware accelerators 108. MMB 200 might typically receive a request to allocate or deallocate a memory block from a requesting module of network processor 100 through a communication ring of network processor 100 coupled to communication interface 208. Requests for memory blocks might be received via a communication ring of network processor 100, such as described in related U.S. patent applications Ser. Nos. 12/782,379, 12/782,393, and 12/782,411, all filed May 18, 2010. A memory block request might typically specify the requested memory block size and whether the memory block will be used for a task queue. MMB 200 processes the memory block request and returns an address of a free memory block in system memory 112, if available, to the requestor, via communication interface 208. If no free memory block is available, or a number of available memory blocks reaches a minimum threshold, MMB 200 might deny the request and return an indication that all memory blocks are in use.

MMB 200 might typically return memory block allocation addresses in the order in which the requests are received. MMB core 202 includes memory access accumulator 204 to accumulate one or more memory accesses to a given memory address, as will be described. MMB core 202 also maintains a reference count for each memory block, for example in reference count manager 206. The reference count might allow for a memory block to be used simultaneously by multiple processing modules of network processor 100. The reference count for a given memory block indicates the number of times the memory block is in use by modules of network processor 100. The reference count might typically be either undefined or initialized to a predetermined value when the memory block is initially allocated. For example, upon allocation of a memory block, its corresponding reference count might be assumed to be equal to 1. The reference count is incremented for each module that needs access to the memory block, and the reference count is decremented as each module completes operation on the memory block. When the reference count for a given memory block is reduced to zero, the memory block is deallocated by MMB core 202. MMB core 202 places the address of the deallocated memory block in free block list 212, allowing the deallocated memory block to be allocated for future memory requests. In some embodiments, the reference count might be stored in a dedicated section of each memory block, for example the first 16 bytes of each block.

Free block list 212 might include one or more lists of memory blocks that are not allocated (i.e., are "free" to be allocated to a requestor). In some embodiments, MMB 200 maintains memory blocks in four sizes, and might also maintain a free block list for each memory block size (e.g., 256 B, 2 kB, 16 kB, and 64 kB). Free block list 212 might also include an associated threshold of minimum free blocks for each block size. When the number of free blocks of a given size falls below the threshold, MMB 200 might deny a request to allocate a new memory block. In some embodiments, MMB 200 might employ multiple thresholds. For example, MMB 200 might employ one threshold level for relatively higher priority data and a second threshold level for relatively lower priority data (e.g., a first threshold value for packet data that might be of a lower priority, and a second threshold value for control data that might be of a higher priority).

Embodiments of MMB 200 might operate substantially as described in related U.S. patent application Ser. No. 12/963, 895, filed Dec. 9, 2010. For example, as described in related U.S. patent application Ser. No. 12/963,895, filed Dec. 9, 2010, allocation and deallocation of memory blocks within system memory 112 (and/or external memory 116) might typically be managed by MMB 200, and the memory blocks might be available for use by any requesting module of network processor 100. MMB 200 might communicate with system memory 112 (and/or external memory 116) via memory interface 210. Memory blocks might include a segment that is reserved to be written only by the corresponding source requestor module for that memory block. In some embodiments of the present invention, each reserved segment is desirably protected against corruption by, for example, generating and writing protection data to the reserved memory segment of each memory block. This protection data might include i) writing parity data of the block to the reserved memory segment; ii) writing error correction code (ECC) data of the block to the reserved memory segment; and iii) writing a unique identifier of the corresponding source requestor to the reserved memory segment of a block.

Also as described in related U.S. patent application Ser. No. 12/963,895, filed Dec. 9, 2010, embodiments of MMB 200 might replace a data cache with memory access accumulator 204, which is an application-specific circuit to accumulate changes (e.g., changes to the reference count) to a memory location. While a read or write request to a memory address is being processed, subsequent accesses to the same memory address might be received by MMB 200, but these subsequent requests might not be processed due to the memory address being used for the prior request. Memory access accumulator 204 accumulates the subsequent access requests and updates memory (e.g., system memory 112) with the accumulated result rather than performing separate operations for each received access request. The number of memory access operations is reduced, thus reducing memory access latency.

Figure 3:
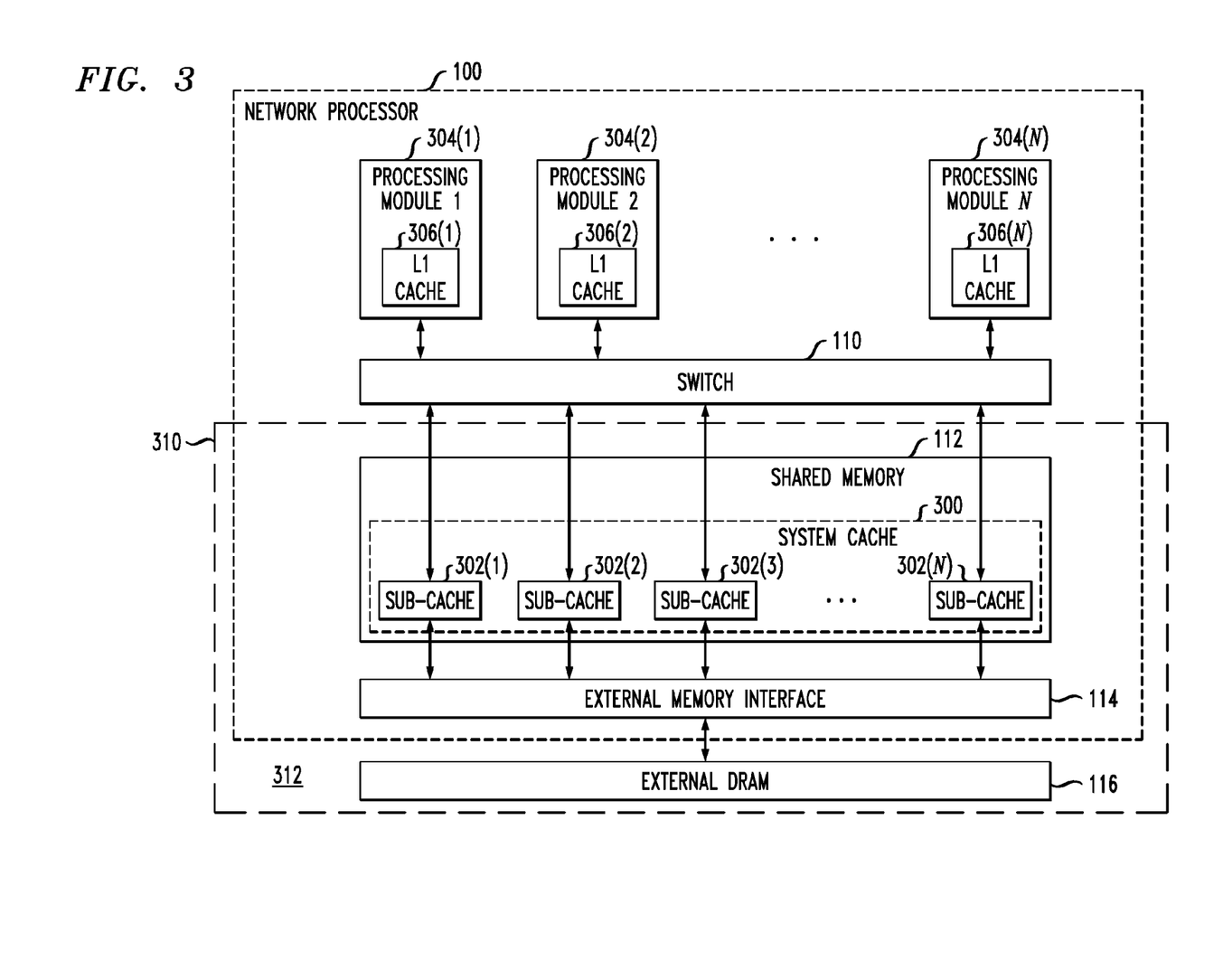
FIG. 3 shows a block diagram of a system cache and local L1 caches of the network processor of FIG. 1 in accordance with exemplary embodiments of the present invention.

FIG. 3 shows a block diagram of an exemplary embodiment of system cache 300 of network processor 100, in accordance with embodiments of the present invention. As shown in FIG. 3, system cache 300 might be implemented in shared memory 112. System cache 300 might include one or more sub-caches, shown as sub-caches 302(1)-302(N). Sub-caches 302(1)-302(N) might be employed to cache data from any µP core or accelerator (e.g., µP cores 106 or accelerators 108) of network processor 100. As indicated by dashed line 310, shared memory 112 and external memory 116 might generally be referred to as system memory 312.

As described in related U.S. patent application Ser. Nos. 12/782,379, 12/782,393, and 12/782,411, which are incorporated by reference herein, sub-caches 302(1)-302(N) might be addressed via switch 110 in such a way as to balance access to the caches, referred to herein as striping, helping to avoid hot spots in shared memory 112, improve performance of the caching in and out of external memory 116, and reduce cache access bottlenecks. Thus, in embodiments of the present invention, each sub-cache 302(1)-302(N) might form a memory array, and the number of system caches might preferably be implemented as a power of two. One or more memory blocks might be allocated to each sub-cache 302(1)-302(N). In embodiments of the present invention, each sub-cache 302(1)-302(N) might be implemented as an N-way associative cache employing a least recently used (LRU) caching algorithm. In some embodiments, each sub-cache 302(1)-302(N) might have a total size of 512 kB and a cache line length of 256 B.

As shown in FIG. 3, one or more processing modules 304(1)-304(N) (e.g., one of hardware accelerators 108) might have a corresponding local level one (L1) cache, shown as L1 caches 306(1)-306(N). The function of L1 caches 306(1)-306(N) is to act as an interface to system cache 300 for client processing modules 304(1)-304(N) of network processor 100. L1 caches 306(1)-306(N) might be referred to as "pipeline" caches, since L1 caches 306(1)-306(N) might typically be employed only for certain ones of client processing modules 304(1)-304(N) that access system cache 300 as part of an execution pipeline.

In general operation of network processor 100, a given processing module 304 might need a given piece of data to perform an operation. The processing module 304 might request the data from system memory 312. In general, recently used data might be stored in system cache 300, while less recently used data might be stored in external memory 116. As described herein, allocation and deallocation of memory blocks in system memory 312 might be generally controlled by MMB 200. Therefore, a given processing module 304 might request, via communication rings 118, MMB 200 allocate or deallocate memory in system memory 312 as desired during operation of network processor 100.

Further, in the virtual pipeline architecture described herein, one or more processing modules 304 might operate on data in a given order (e.g., a "virtual pipeline"). In such a case, a first one of processing modules 304 might have stored data in system memory 312 that could be used by a subsequent one of processing modules 304 in the given virtual pipeline. However, in other cases, data stored in system memory 312 by a first one of processing modules 304 might not be used by a subsequent one of processing modules 304 in the given virtual pipeline (e.g., the data is "unneeded data"). If the unneeded data also has a corresponding entry in system cache 300, the corresponding entry can be invalidated (e.g., the data in the cache is "invalid data"). Invalid data and unneeded data do not need to be written to external memory 116.

Utilization and performance of system cache 300 and external memory 116 might be improved when the contents of a deallocated memory block are invalidated early in system cache 300. As described herein, MMB 200 might allocate one or more memory block addresses to a given processing module 304, the block addresses each specifying a memory block of system memory 312. Each memory block might be of a determined size to be used by the processing module 304 to operate on data. For example, data might generally be stored in system memory 312 until the data is needed for an operation. If the data to be operated on is not stored in system cache 300, external memory 116 is read to populate the needed data in a corresponding one of sub-caches 302 of system cache 300, and processing module 304 reads the data from system cache 300. If the data operated on is already stored in system cache 300, external memory 116 is not read, and processing module 304 reads the data directly from system cache 300. As the processing module 304 operates on the data, data might be read from system memory 312 and temporarily stored in a corresponding L1 cache 306 (if any). When the processing module 304 is finished operating with the data, the memory block of system memory 312 might be deallocated by MMB 200 if the block does not contain any valid data in use by any of processing modules 304 (e.g., the data is unneeded data or invalid data). Similarly, any updated data stored in system cache 300 might be written to external memory 116 to reflect data changed by the processing module 304. When the processing module 304 is finished operating with the data, the corresponding entry in system cache 300 might, or might not, still contain the data. For example, if the cache is relatively highly used, or the operation by processing module 304 takes a relatively long amount of time, the corresponding cache entry might be evicted from system cache 300 to store other data. Similarly, if the cache is relatively lightly used, or the operation by processing module 304 takes a relatively short amount of time, the corresponding cache entry might still exist within system cache 300.

Embodiments of the present invention invalidate any data remaining in system cache 300 that is associated with a deallocated memory block of system memory 312, which improves performance of system cache 300 by allowing cache memory to be freed earlier and re-used sooner. This also reduces processing effort of system cache 300 by avoiding writing invalid and unneeded data corresponding to a deallocated memory block to external memory 116, and thus also improves bandwidth availability of external memory 116.

As described herein, block addresses in system memory 312 are allocated by MMB 200 for use by various of processing modules 304 of network processor 100. For example, each block address represents a fixed block of system memory 312. As shown in FIG. 3, external memory 116 interfaces with system cache 300. A given processing module 304 might use one or more blocks in system memory 312 to store, for example, packet data. One or more blocks might be fully or partially used to store the packet data. Each block is not necessarily contiguous in system memory 312, and partially used blocks might not necessarily store data contiguously within the partially used block. As one of processing modules 304 accesses the contents in one or more blocks of system memory 312, one or more corresponding entries in system cache 300 are updated. System cache 300 might contain all or part of the data in the corresponding memory block(s) of external memory 116. When the given processing module 304 completes operating on the data stored in a given block in system memory 312, the processing module 304 requests MMB 200 decrement the reference count of the memory block. If the reference count becomes equal to a threshold value (e.g., 0), then the memory block can be deallocated. In such an instance, data corresponding to the memory block in system memory 312 might still be stored in system cache 300, for example if the cache entry was not evicted. Once a memory block is deallocated, MMB 200 places the block address in free block list 212, and the block can be reallocated.

Before MMB 200 deallocates (and then could reallocate) the given memory block, embodiments of the present invention send an indication to system cache 300 to invalidate the data corresponding to the memory block deallocate request sent to MMB 200. The invalidate request might include all or part of the data in system cache 300 corresponding to the deallocated memory block of system memory 312. The space in system cache 300 previously dedicated to storing data from the memory block(s) of system memory 312 is now free and might be re-used by various processing modules of network processor 100. Consequently, the data corresponding to deallocated memory blocks of system memory 312 occupies space in system cache 300 for less time, thus improving usage and efficiency of system cache 300. If the data in the cache was not invalidated when the blocks in system memory 312 are deallocated, cache contention might occur, resulting in the discarded information being protected by the cache and cache resources utilized to write the discarded information back to external memory 116 before the space is freed in system cache 300.

Thus, performance and utilization of system cache 300 is improved because the cache resources are not used to maintain data from deallocated memory blocks. System cache 300 is more efficiently used because it contains a higher percentage of active memory block information and the performance impact of writing discarded information from system cache to external memory 116 before the corresponding memory block is deallocated is substantially reduced. In some embodiments, precedent to (or concurrent with) MMB 200 deallocating a memory block of system memory 312, the data associated with the memory block is invalidated and removed from the cache by a corresponding processing module 304 issuing a cache invalidate command to system cache 300.

Figure 4:
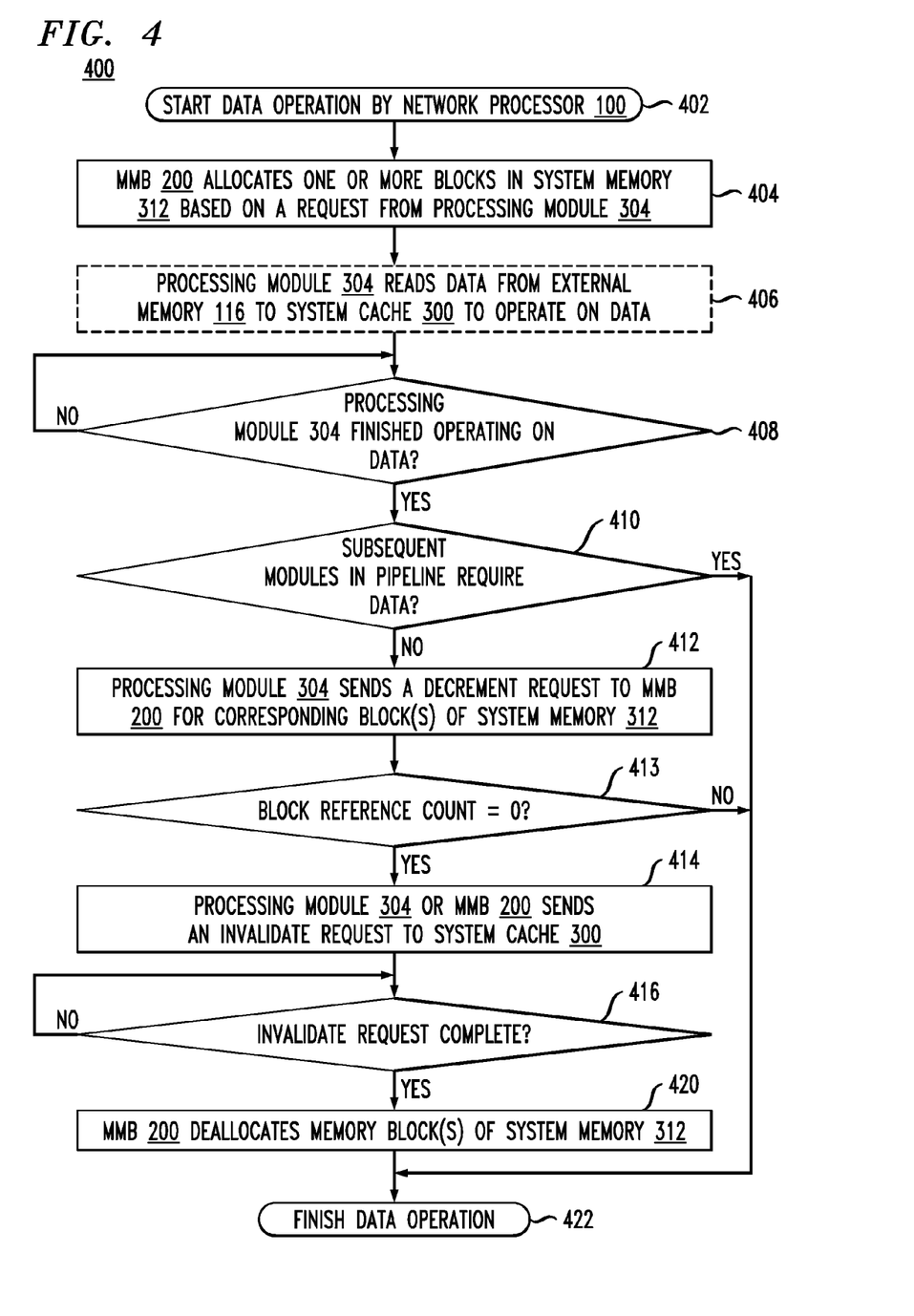
FIG. 4 shows a flow diagram of an operation of the system cache of FIG. 3 in accordance with exemplary embodiments of the present invention.

FIG. 4 shows a flow chart of exemplary cache operation 400 of network processor 100. As shown in FIG. 4, at step 402 a data operation is started by network processor 100. For example, a packet is received from communication link 102 and network processor 100 begins processing the packet by generating one or more tasks corresponding to the packet, where the tasks are processed by one or more of processing modules 304 as part of a virtual pipeline corresponding to the packet. At step 404, a given one of processing modules 304 requests one or more memory blocks from MMB 200, and MMB 200 allocates one or more memory blocks in system memory 312 such that the packet data or other data corresponding to the tasks might be stored. At step 406, processing module 304 reads all or part of the data from external memory 116 into system cache 300, such that processing module 304 might operate on the data. As indicated by the dashed line, step 406 is optionally performed, for example, if the data to be operated on is not already stored in system cache 300. In that case, step 406 is performed to read external memory 116 to populate the needed data in system cache 300. After step 406, or after step 404 if step 406 is not performed, process 400 proceeds to step 408.

After step 408, once processing module 304 finishes operating on the data in system cache 300, at step 410, processing module 304 might determine whether one or more subsequent modules in the virtual pipeline require the data that is stored in system cache 300 (and system memory 312). For example, based on the corresponding virtual pipeline identifier of the tasks, processing module 304 might determine what data a subsequent, if any, processing module in the virtual pipeline might require. If, at step 410, the data is required by one or more subsequent processing modules, operation 400 completes at step 422. If, at step 410, the data is not required by any subsequent processing modules, at step 412, processing module 304 sends a reference count decrement request to MMB 200 for the one or more blocks of system memory 312.

In the event that the decrement request reduces the reference count to zero, the one or more blocks are no longer in use by any processing modules 304, and the one or more blocks can be deallocated (e.g., unneeded data). At step 413, MMB 200 checks a reference count of the one or more blocks requested to have their reference counts decremented. For example, in some embodiments, MMB 200 tracks indicators for each of the various memory blocks (e.g., a reference count, etc.) in system memory 312. When a reference count reaches zero, the data in the memory block is no longer in use by any processing module 304 of network processor 100 (e.g., unneeded data). Thus, memory blocks with a reference count of zero can be deallocated by MMB 200. MMB 200 might also desirably invalidate any data corresponding to the deallocated blocks from system cache 300 since, once the reference count becomes zero, there is no risk that the data in system cache 300 is still in use by one of processing modules 304 (e.g., unneeded data). If, at step 413, the reference count is not zero, the memory blocks should not yet be deallocated, and operation 400 completes at step 422. If, at step 413, the reference count is equal to zero, at step 414, one of processing module 304 or MMB 200 sends a cache invalidate request to system cache 300. In some embodiments, each processing module 304 might issue a command to system cache 300 to invalidate cache entries, for example when the cache entry corresponds to a memory block that is to be deallocated. Processing modules 304 might issue the cache invalidate command to system cache 300 via switch 110. In alternative embodiments, MMB 200 might issue a command to system cache 300 to invalidate cache entries when MMB 200 receives a request to deallocate memory blocks in system memory 312 from one of processing modules 304. As described herein, when the processing module 304 is finished operating with the data, the corresponding entry in system cache 300 might, or might not, still contain the data. In some embodiments, if the corresponding cache entry had already been evicted from system cache 300, the invalidate request might be ignored.

As described, MMB 200 might wait, at step 416, for the system cache invalidate request to complete before deallocating the corresponding memory blocks in system memory 312. By waiting at step 416 for the invalidate request to be completed, data corruption can be avoided. For example, if the memory block is deallocated and then re-allocated before the invalidate request completes, the new data from the active allocate might be invalidated and lost, even though the data from the active allocate is not unneeded data or invalid data. Once the cache invalidate request is complete at step 416, then at step 420, MMB 200 deallocates the one or more corresponding memory blocks of system memory 312 without writing the invalidated data from system cache 300 to external memory 116. Thus, efficiency of network processor 100 is improved by reducing the number of write operations from system cache 300 to external memory 116 and also reducing the length of time that data remains in system cache 300. Additionally, bandwidth of the external memory is more efficiently employed by performing fewer write operations to the external memory.

Thus, as described herein, embodiments of the present invention provide a network processor having a plurality of processing modules coupled to a system cache and a shared memory. A memory manager allocates blocks of the shared memory to a requesting one of the processing modules. The allocated blocks store data corresponding to packets received by the network processor. The memory manager maintains a reference count for each allocated memory block indicating a number of processing modules accessing the block. One of the processing modules reads the data stored in the allocated memory blocks, stores the read data to corresponding entries of the system cache and operates on the data stored in the system cache. Upon completion of operation on the data, the processing module requests to decrement the reference count of each memory block. Upon receiving the request to decrement the reference count of each of the memory blocks, the memory manager determines the updated reference count of the memory blocks. When the reference count for a given memory block reaches a predetermined threshold value: (1) the given memory block contains unneeded data, (2) the one or more entries in the system cache corresponding to the unneeded data are invalidated, making the entries of the system cache available to store new data, and (3) the given memory block is deallocated, making the given memory block available to be reallocated.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A network processor comprising:
a plurality of processing modules coupled to a system cache and at least one shared memory;
a memory manager configured to allocate one or more blocks of the shared memory to a requesting one of the plurality of processing modules, wherein the one or more allocated blocks store data corresponding to one or more packets received by the network processor, wherein the memory manager comprises a reference counter configured to maintain, for each allocated memory block, a reference count value indicating a number of access requests of corresponding ones of the plurality of processing modules accessing the memory block;
one of the plurality of processing modules, based on a pipeline identifier corresponding to each received packet, is configured to (i) read at least a portion of the data stored in the allocated blocks of the shared memory, (ii) store the read data to one or more corresponding entries of the system cache, (iii) operate on the data stored in the system cache, and (iv) upon completion of operation on the data stored in the system cache, send a request to the memory manager to decrement the reference counter of each of the one or more blocks in the shared memory;
wherein, upon receiving the request to decrement the reference counter of each of the one or more blocks in the shared memory, the memory manager is configured to: (i) determine the reference count of the corresponding one or more blocks in the shared memory, and (ii) when the reference counter for a given memory block reaches a predetermined threshold value:
(1) determine that the given memory block contains unneeded data;
(2) invalidate the one or more entries in the system cache corresponding to the unneeded data, thereby making the one or more entries of the system cache available to store new data and preventing a write operation to write the unneeded data from the system cache to the shared memory; and
(3) deallocate the given memory block, thereby making the given memory block available to be reallocated.

2. The network processor of claim 1, wherein, upon completion of operation on the data stored in the system cache, the requesting one of the plurality of processing modules is further configured to:
   determine, based on the pipeline identifier corresponding to the one or more packets, whether a next one of the plurality of processing modules in the corresponding pipeline requires the data stored in the system cache; and
   if the next one of the plurality of processing modules requires the data stored in the system cache:
      suspend invalidating the one or more entries of the system cache, thereby retaining the data in the system cache for the next one of the plurality of processing modules; and
      maintain the allocated one or more corresponding blocks of shared memory.

3. The network processor of claim 2, wherein, if the next one of the plurality of processing modules requires the data stored in the system cache, the system cache is further configured to:
   write valid data from the system cache to the corresponding one or more blocks of shared memory.

4. The network processor of claim 1, wherein the memory manager is further configured to:
   wait for the one or more entries in the system cache to be invalidated before deallocating the one or more blocks in the shared memory, thereby preventing a data corruption.

5. The network processor of claim 1, wherein the memory manager further comprises:
   a free block list configured to track availability of one or more memory blocks of the shared memory;
   wherein, when the reference counter for a given memory block reaches the predetermined threshold value, the memory manager is configured to place the given memory block in the free block list.

6. The network processor of claim 1, wherein the reference counter maintains the reference count value of a given allocated memory block by incrementing the reference count value for each corresponding processing module accessing the given allocated memory block, and decrementing the reference count value when a corresponding processing module ends accessing the memory block.

7. The network processor of claim 1, wherein the predetermined threshold value is zero.

8. The network processor of claim 1, wherein the reference count value is located with data in the allocated memory block.

9. The network processor of claim 1, wherein:
   one of the processing modules is configured to (1) request data for an operation from the system cache, wherein if the requested data is not stored in the system cache, the system cache is configured to (i) read the requested data from the shared memory and (ii) store the read data to one or more entries in the system cache, and (2) read the requested data from the system cache;
   if the system cache becomes full beyond a threshold, the system cache is configured to evict one or more entries from the system cache to store new data in the one or more entries; and
   if, upon receiving the request to decrement the reference counter of each of the one or more blocks in the shared memory, the one or more cache entries corresponding to the data read from the system cache have been evicted, the system cache is configured to ignore the request to invalidate the one or more entries in the system cache corresponding to the unneeded data.

10. The network processor of claim 1, wherein the network processor is implemented in an integrated circuit.

11. A method of managing a shared memory of a network processor having a plurality of processing modules coupled to a system cache and at least one shared memory, the method comprising:
   allocating, by a memory manager of the network processor, one or more blocks of the shared memory to a requesting one of the plurality of processing modules, wherein the one or more allocated blocks store data corresponding to one or more packets received by the network processor;
   maintaining, by the memory manager, a reference count value for each allocated memory block, the reference count value indicating a number of access requests of corresponding ones of the plurality of processing modules accessing the memory block;
   by one of the plurality of processing modules:
      reading at least a portion of the data stored in the allocated blocks of the shared memory;
      storing the read data to one or more corresponding entries of the system cache;
      operating on the data stored in the system cache; and
      upon completion of operation on the data stored in the system cache, sending a request to the memory manager to decrement the reference counter of each of the one or more blocks in the shared memory;
   by the memory manager:
   upon receiving the request to decrement the reference counter of each of the one or more blocks in the shared memory:
      determining the reference count of the corresponding one or more blocks in the shared memory;
      when the reference counter for a given memory block reaches a predetermined threshold value:
         (1) determining that the given memory block contains unneeded data;
         (2) invalidating the one or more entries in the system cache corresponding to the unneeded data, thereby making the one or more entries of the system cache available to store new data and preventing a write operation to write the unneeded data from the system cache to the shared memory; and
         (3) deallocating the given memory block, thereby making the given memory block available to be reallocated.

12. The method of claim 11, wherein, upon completion of operation on the data stored in the system cache, the method further comprises:
   by the requesting one of the plurality of processing modules:
      determining, based on a pipeline identifier corresponding to the one or more packets, whether a next one of the plurality of processing modules in the corresponding pipeline requires the data stored in the system cache; and
      if the next one of the plurality of processing modules requires the data stored in the system cache:
         suspending invalidating the one or more entries of the system cache, thereby retaining the data in the system cache for the next one of the plurality of processing modules; and
         maintaining the allocated one or more corresponding blocks of shared memory.

13. The method of claim 11, wherein, if the next one of the plurality of processing modules requires the data stored in the system cache, the method further comprises:

writing valid data from the system cache to the corresponding one or more blocks of shared memory.

14. The method of claim 11, further comprising:
waiting, by the memory manager, for the one or more entries in the system cache to be invalidated before deallocating the one or more blocks in the shared memory, thereby preventing data corruption.

15. The method of claim 11, further comprising:
tracking, by a free block list of the memory manager, availability of one or more memory blocks of the shared memory;
when the reference counter for a given memory block reaches the predetermined threshold value:
placing, by the memory manager, the given memory block in the free block list.

16. The method of claim 11, further comprising:
by the memory manager:
incrementing the reference count value for each corresponding processing module accessing the given allocated memory block; and
decrementing the reference count value when a corresponding processing module ends accessing the memory block.

17. The method of claim 11, wherein the reference count value is located with data at the allocated memory block.

18. The method of claim 11, wherein the predetermined threshold value is zero.

19. The method of claim 11, further comprising:
requesting, by one of the processing modules, data for an operation from the system cache;
if the requested data is not stored in the system cache:
reading, by the system cache, the requested data from the shared memory; and
storing the read data to one or more entries in the system cache;
reading, by the requesting processing module, the requested data from the system cache;
if the system cache becomes full beyond a threshold:
evicting, by the system cache, one or more entries from the system cache to store new data in the one or more entries; and
if, upon receiving the request to decrement the reference counter of each of the one or more blocks in the shared memory, the one or more cache entries corresponding to the data read from the system cache have been evicted:
ignoring, by the system cache, the request to invalidate the one or more entries in the system cache corresponding to the unneeded data.

20. A non-transitory machine-readable medium, having encoded thereon program code, wherein, when the program code is executed by a machine, the machine implements a method of managing a shared memory of a network processor having a plurality of processing modules coupled to a system cache and at least one shared memory, the method comprising:
allocating, by a memory manager of the network processor, one or more blocks of the shared memory to a requesting one of the plurality of processing modules, wherein the one or more allocated blocks store data corresponding to one or more packets received by the network processor;
maintaining, by the memory manager, a reference count value for each allocated memory block, the reference count value indicating a number of access requests of corresponding ones of the plurality of processing modules accessing the memory block;
by one of the plurality of processing modules:
reading at least a portion of the data stored in the allocated blocks of the shared memory;
storing the read data to one or more corresponding entries of the system cache;
operating on the data stored in the system cache; and
upon completion of operation on the data stored in the system cache, sending a request to the memory manager to decrement the reference counter of each of the one or more blocks in the shared memory;
by the memory manager:
upon receiving the request to decrement the reference counter of each of the one or more blocks in the shared memory:
determining the reference count of the corresponding one or more blocks in the shared memory;
when the reference counter for a given memory block reaches a predetermined threshold value:
(1) determining that the given memory block contains unneeded data;
(2) invalidating the one or more entries in the system cache corresponding to the unneeded data, thereby making the one or more entries of the system cache available to store new data and preventing a write operation to write the unneeded data from the system cache to the shared memory; and
(3) deallocating the given memory block, thereby making the given memory block available to be reallocated.

* * * * *